J. E. LEONARD.
DOUBLE EXPOSURE MECHANISM FOR MOTION PICTURE CAMERAS.
APPLICATION FILED APR. 20, 1917.
1,352,668.
Patented Sept. 14, 1920.
2 SHEETS—SHEET 1.
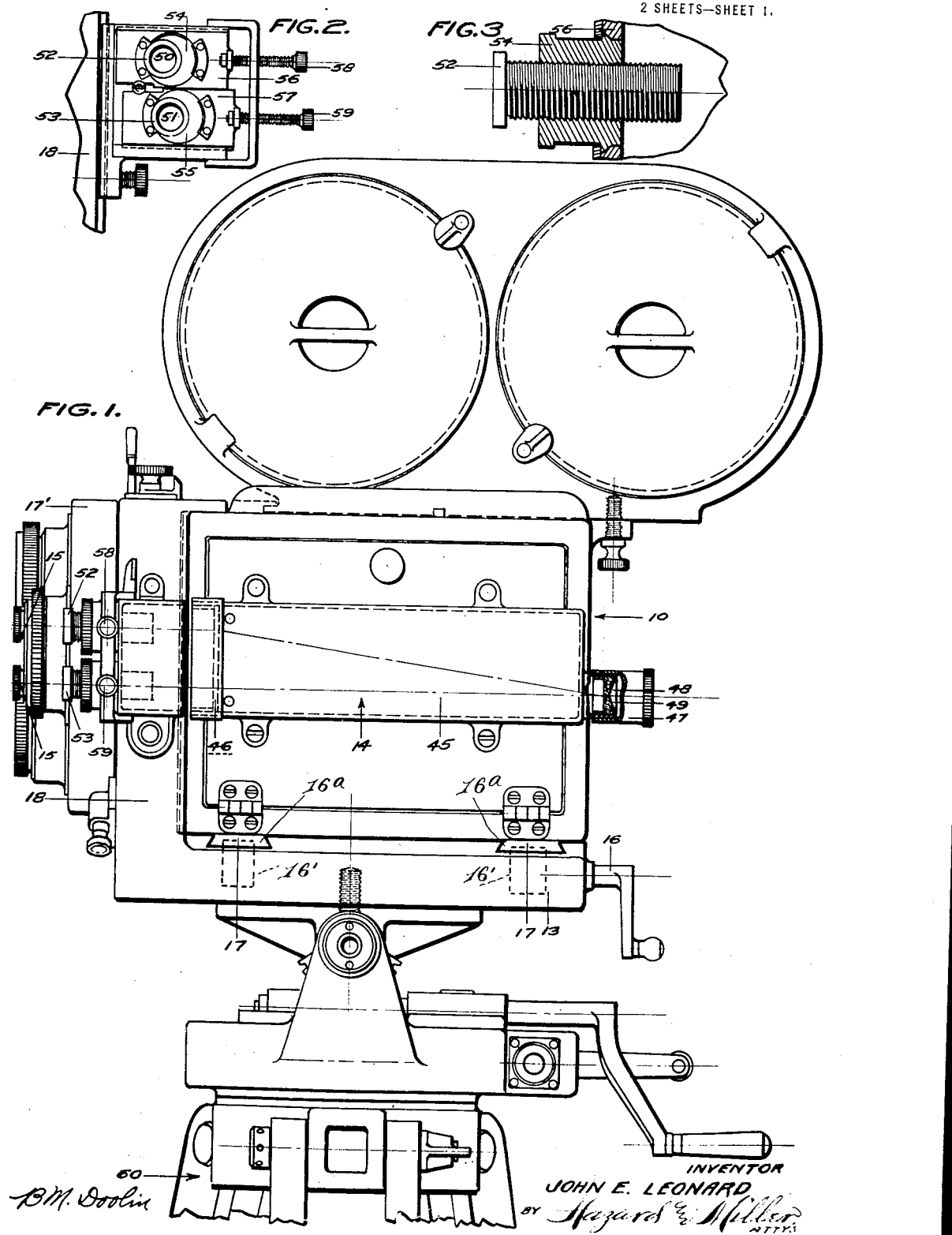
INVENTOR
JOHN E. LEONARD

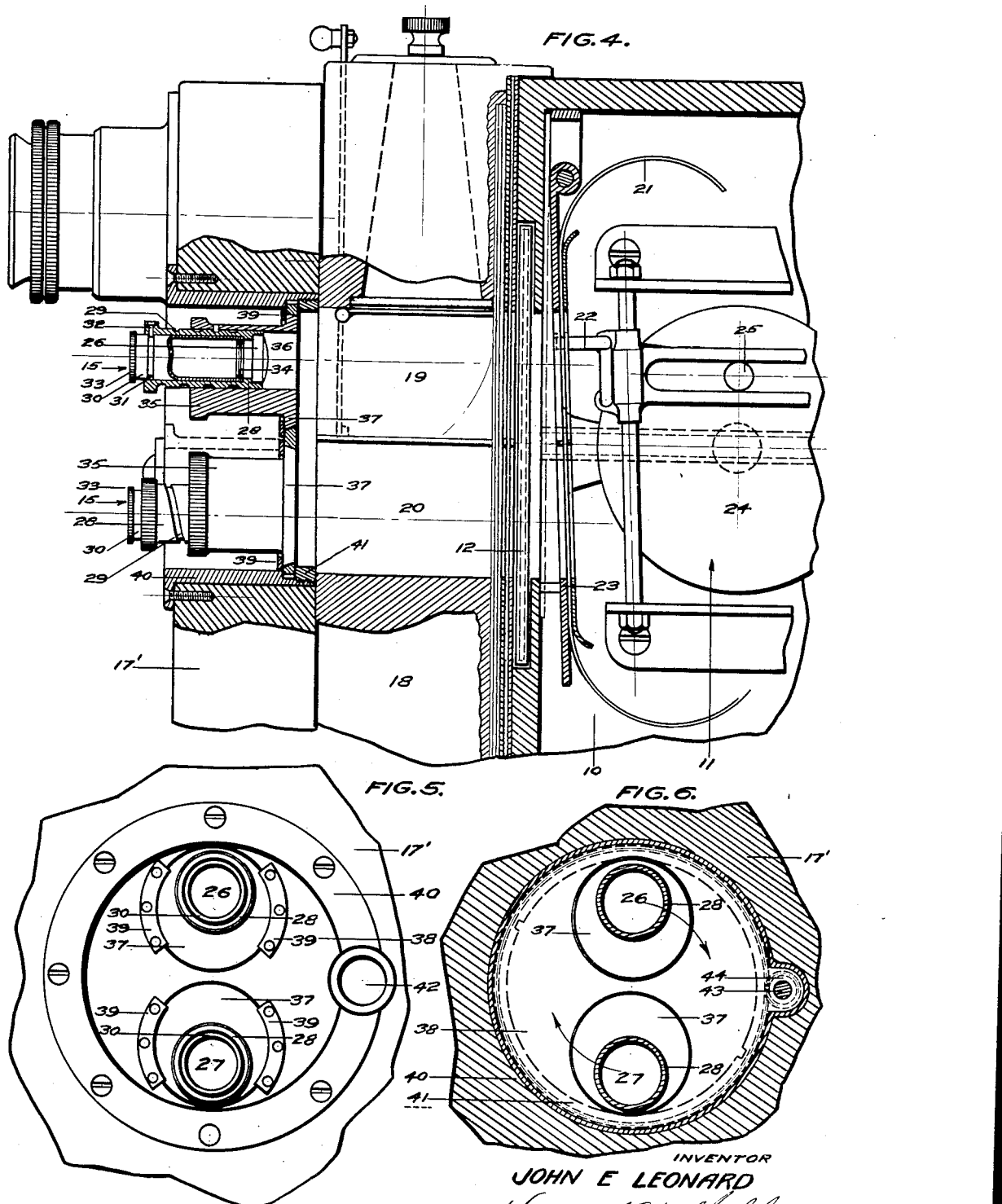

UNITED STATES PATENT OFFICE.

JOHN E. LEONARD, OF LOS ANGELES, CALIFORNIA, ASSIGNOR TO THE NATIONAL MOTION PICTURE CAMERA COMPANY, OF LOS ANGELES, CALIFORNIA, A CORPORATION OF CALIFORNIA.

DOUBLE-EXPOSURE MECHANISM FOR MOTION-PICTURE CAMERAS.

1,352,668.   Specification of Letters Patent.   Patented Sept. 14, 1920.

Application filed April 20, 1917. Serial No. 163,497.

*To all whom it may concern:*

Be it known that I, JOHN E. LEONARD, a citizen of the United States, residing at Los Angeles, in the county of Los Angeles and State of California, have invented new and useful Improvements in Double-Exposure Mechanisms for Motion-Picture Cameras, of which the following is a specification.

This invention relates to a moving picture camera and particularly pertains to a double exposure mechanism and a finder therefor.

It is the principal object of this invention to provide a pair of photographic lenses adapted to expose separate portions of a film simultaneously and through superimposed apertures as the film is moved intermittently and successively across said apertures.

Another object of this invention is to provide a pair of double exposure lenses which may be adjusted in relation to each other and superimposed exposure apertures so that the same scene may be taken successively through the two openings and upon the same film in exact register, or the same scenes may be taken so as to appear in separate positions upon a single photographic film and also so that two scenes may be photographed upon the same field separately or collectively without a re-take of the film or other means whereby the film is re-wound and exposed a second time.

Another object of this invention is to provide separate lens diaphragms whereby the intensity of the light rays passing through the two exposure apertures may be varied in order to produce various effects and may be regulated during the operation of the camera, if desired.

Another object of this invention is to provide separate focal adjustment for each of the lenses so that two separate scenes disposed at different distances from the camera may be photographed simultaneously upon the film and in exact photographic register with each other.

Another object of this invention is to provide means whereby the lenses may be universally adjusted in relation to each other throughout a vertical plane which includes the field area of the film exposed through both of the apertures.

Another object of this invention is to provide a view finder which may be brought to register with the photographic lenses, as particularly disclosed in my copending application entitled, Finders in combination with camera shifting mechanism, Serial No. 163,499, filed April 20, 1917, and will permit the scenes exposed through two double exposure lenses to be simultaneously observed through a single eye-piece.

Another object of this invention is to provide a lens within the eye-piece of said finder whereby the scenes in focus with the two lenses may be superimposed so that the lenses may be adjusted to bring all of the elements of both "sets" in the desired register with each other, as they will appear upon a single photographic field.

Another object of this invention is to provide a pair of focusing lenses which are disposed alongside the photographic lenses and which may be adjusted to exactly correspond to the adjustment of the photographic lenses and thereafter observed through the eye-piece of the finder during the operation of the camera in a manner to substantially ascertain the scenes being taken within the camera and their relation to each other upon the film.

Another object of this invention is to provide a pair of double exposure lenses adapted to project scenes through two superimposed exposure apertures and which may be used in connection with the mechanism disclosed in my co-pending application entitled, White dissolve mechanism for motion picture cameras, Serial No. 163,498, filed April 20, 1917, in a manner to produce visionary scenes upon the photographic field of the camera without requiring a re-take of the film.

It is a further object of this invention to provide a double exposure mechanism for moving picture cameras and a finder therefor, both of which are simple in their construction and may be easily and universally adjusted to produce substantially all of the effects now produced by re-taking the film and insuring that the scenes upon the film will be in perfect register and that the various actors shown in the scenes may play their parts simultaneously, even though they are separated and are within different "sets".

Other objects will appear hereinafter.

The invention is illustrated, by way of example, in the accompanying drawings in which:

Figure 1 is a view in side elevation illustrating the moving picture camera and particularly disclosing the double exposure lenses and the finder provided for use in conjunction therewith.

Fig. 2 is a view in end elevation of the finder lenses and particularly discloses their universal adjustment.

Fig. 3 is a view in transverse section and elevation as seen through the sleeve of one of the lenses shown in Fig. 2 and particularly discloses the focal adjustment of the lens, as well as the eccentric sleeve in which it is mounted.

Fig. 4 is an enlarged fragmentary view in section and elevation illustrating the double exposure lenses, the superimposed exposure apertures through which they focus and the shutter and film moving mechanism disposed adjacent thereto.

Fig. 5 is a view in elevation disclosing the arrangement of the two photographic lenses and particularly discloses the lenses in their extreme vertically separated positions of adjustment.

Fig. 6 is a view illustrating the photographic lenses with the front of their case removed to more clearly disclose the manner in which the lenses are simultaneously rotated around the horizontal axis of the end mounting.

Referring more particularly to the drawings, 10 indicates a camera case within which a film moving mechanism 11 is positioned and a shutter apparatus 12. This case is mounted upon a base 13 and is held in slidable relation thereto by a camera shifting mechanism particularly described in my co-pending application entitled, Finders in combination with camera shifting mechanism for focusing, Serial No. 163,499, filed April 20, 1917. A view-finder 14 is disposed upon the side of the camera and in horizontal alinement with photographic lenses 15 with which the finder may be brought to register by the shifting movement of the lever 16. The lever 16 operates a shaft carrying pinions 16' meshing with gear racks 16ª upon the bottom of the camera case 10, so that by manipulating the lever the case 10 is moved back and forth transversely of the base 13. This will cause the camera to slide upon the V-shaped ways 17 of the base. The lenses are mounted upon the vertical upright 18 of the base and are directly secured upon a circular revolving block 17' which permits a battery of lenses to be successively disposed before exposure apertures 19 and 20 which extend through the upright portion of the base block and communicate with the shutter by which the light is controlled in its passage to a motion picture film 21.

The movement of said film is intermittently effected by feed-fingers 22 which engage the perforations upon the opposite side of the film as it moves along a slide-plate 23, as particularly shown in Fig. 4 of the drawings. These fingers are reciprocated by a crank-disk 24 upon which a pin 25 is mounted and which causes the film to successively register with aperture 19 and aperture 20 disposed therebeneath. The detail construction of the film moving mechanism is more particularly disclosed in my co-pending application entitled, Film moving mechanism for moving picture cameras, Serial No. 163,496, filed April 20, 1917.

As particularly shown in the drawings, a pair of photographic lenses 26 and 27 are mounted before the apertures 19 and 20. These lenses are separately mounted within lens sleeves 28 which are formed with an external thread 29. This thread is of long pitch so that the sleeve may be quickly adjusted to bring the lens to focus with the film. Mounted within the lens sleeve is a diaphragm-sleeve 30. This sleeve is formed with an annular groove 31 engaged by a pin 32 which permits it to be rotated by means of its knurled end 33. This rotation will operate the iris 34 by which the volume of light passing through to the lens may be regulated. The lens sleeve is mounted by means of its exterior threads within an eccentric sleeve member 35. This member is formed with an opening 36 which is eccentrically disposed through the member and receives the lens and its sleeve. The rear end of the eccentric sleeve is formed with a circular flange 37 which is rotatably confined within a swivel-plate 38 by means of retaining plates 39. The swivel-plate 38 is mounted within a counter-bore formed at the back of a lens mounting 40, from which the lens sleeves, as previously described, project. A circular lock-nut 41 is disposed in the rear of the plate 38 and holds it in position. The plate 38 is adapted to be rotated by means of a thumb-nut 42 which is mounted at the outer end of a pinion-shaft 43. This shaft is provided with a pinion 44 to which it is fixed. The pinion is in mesh with gear-teeth which extend entirely around the circular periphery of the plate 38 and by which this plate may be rotated within the mounting 40. As will be understood rotation of this plate will cause both of the lenses to move simultaneously in opposite directions, as particularly shown in Fig. 6 of the drawings, The view-finder 14 which is adapted to be brought to register with the apertures 19 and 20 by the shifting member 16 is particularly disclosed in Fig. 1 of the drawings. As here shown, the finder is composed of a tube 45, a ground-glass 46 which is positioned at the front end of the tube and an eye-piece 47 positioned at the rear of the tube. This tube is preferably rectangular in shape and is of dimensions which will permit it to include both the apertures 19 and 20, when used. The eye-piece 47 is commonly equipped with a focusing lens of ordinary construction. However, in the present instance it is formed with a pair of focusing-prisms 48 and 49. These prisms are vertically disposed in relation to each other and come in contact along the horizontal center line of the eye-piece. Due to the formation of the prisms, images projected through the photographic lens 27 and appearing upon the ground-glass 46 will appear to register with the images projected by the lens 26 when the line of vision falls directly along the line of contact between the prisms 48 and 49. In this manner the operator may simultaneously observe two scenes and accurately ascertain the exact relation the two scenes will bear to each other upon the film.

Under working conditions the tube 45 of the finder is in register with auxiliary lenses 50 and 51 which are secured to the side of the upright portion camera base and are disposed in substantial alinement with the lenses 26 and 27. The auxiliary lenses are mounted within focusing sleeves 52 and 53. These sleeves, in turn, are mounted within eccentric mountings 54 and 55 which permit the two lenses to be horizontally and vertically adjusted in relation to each other. The mountings 54 and 55 are rotatably secured within plates 56 and 57 by which the lenses may be horizontally adjusted in relation to each other when adjusting screws 58 and 59 are manipulated, as particularly shown in Fig. 2 of the drawings.

When pictures are to be taken the camera is set up on its tripod 60 and after being leveled, the camera case is shifted by means of the lever 16 to bring the finder 14 in alinement with the superimposed exposure apertures 19 and 20. When in this position the lenses 26 and 27 may be adjusted to properly focus one or two scenes upon the ground-glass 46. This adjustment is effected by three means, the rotation of the plate 38, by the movement of the thumb-nut 42, the individual movement of the lenses 27 and 26 in relation to each other as the eccentric sleeves 35 are rotated and the focusing of the lens by rotation of the lens sleeve 28 which will cause the lens to be advanced or retracted in relation to the film. In case one scene is to be photographed simultaneously through the apertures 19 and 20, the lenses are placed in vertical superimposed relation to each other. Observation through the eye-piece 47 with the eye directly in line with the adjacent edges of the prisms 48 and 49 will cause the scenes which have been projected through the lenses 26 and 27 to appear in register with each other and as a single view, and then two scenes will be combined in a single view upon the film. The lenses are off-set in relation to each other and when the two views are observed through the eye-piece, as previously described, the pictures will register with the various elements of each view appearing in its exact relation to each other.

After the lenses have been adjusted and focused to produce the character of picture desired and to record the subject intended, the camera case is shifted to its original position which simultaneously causes the finder 14 to register with the auxiliary lens mounting and the film within the case to register with the exposure apertures 19 and 20. When the auxiliary lenses and the finder have thus been brought to register, these lenses may be adjusted by the various expedients and provided to register the scene upon the lenses 48 and 49 within the eye-piece as they will appear upon the film.

The intensity of the light rays passing through the lenses 26 and 27 may be made uniform or varied, as the case may require, by rotation of the diaphragm-sleeve 30 and thereby opening or closing the iris 34. The exact subject matter in focus with each of the lenses may be readily ascertained by moving the eye above and below the center line of the eye-piece and thereby observing the scene projected through each aperture individually.

The pictures are taken by moving the film in either direction vertically over the apertures 19 and 20. One scene will be recorded upon the film by means of the light rays projecting through the lens 26 and the aperture 19 and the other scene will be recorded by the light rays projecting through the lens 27 and the aperture 20. Due to the fact that the feed-fingers 22 will move the film the height of the apertures, each photograph will be successively and doubly exposed to the light rays of the superimposed lenses 26 and 27. This obviates the necessity of re-taking portions of the film when double exposure effects are desired and also permits a white dissolve to be obtained upon the film by means of the mechanism disclosed in my co-pending application entitled, White dissolve mechanism for motion picture cameras, Serial No. 163,498, Filed April 20, 1917, which is mounted in connection with the upper exposure aperture 19.

It will thus be seen that, due to the use of two superimposed exposure apertures and a pair of universally movable photographic lenses, unlimited variety of scenes and effects may be obtained and that the scenes may be accurately determined by observation through the peculiar finder here disclosed and which is adapted to register directly with the photographic lens when the camera is set up for operation.

While I have shown the preferred construction of my double exposure mechanism for motion picture cameras, as now known to me, it will be understood that various changes in the combination, construction and arrangement of parts may be made by those skilled in the art without departing from the spirit of my invention.

I claim:

1. In a motion picture camera; an aperture plate having two openings corresponding to different pictures on a standard strip of film; two lenses; means for adjusting the position of each lens with regard to one of said openings; a ground glass member; means for placing said ground glass member directly behind said aperture plate; and an optical system by which an observer sees the images produced by the two lenses superimposed on each other.

2. In a motion picture camera; an aperture plate having two openings corresponding to different pictures on a standard strip of film; two lenses; an iris diaphram for each lens; means for adjusting the position of each lens with regard to one of said openings; a ground glass member; means for placing said ground glass member directly behind said aperture plate; and an optical system by which an observer sees the images produced by the two lenses superimposed on each other.

3. In a motion picture camera; an aperture plate having two openings corresponding to different pictures on a standard strip of film; two lenses; means for adjusting the position of each lens with regard to one of said openings; means for separately focusing each lens; a ground glass member; means for placing said ground glass member directly behind said aperture plate; and an optical system by which an observer sees the images produced by the two lenses superimposed on each other.

4. In a motion picture camera; an aperture plate having two openings corresponding to different pictures on a standard strip of film; two lenses; an iris diaphragm for each lens; means for adjusting the position of each lens with regard to one of said openings; means for separately focusing each lens; a ground glass member; means for placing said ground glass member directly behind said aperture plate; and an optical system by which an observer sees the images produced by the two lenses superimposed on each other.

5. In a motion picture camera; an aperture plate having two openings corresponding to different pictures on a standard strip of film; two lenses; means for adjusting the position of each lens with regard to one of said openings; a ground glass member; means for placing said ground glass member directly behind said aperture plate; and a pair of prisms through which an observer may see said ground glass, said prisms being so set that they superimpose upon each other the two images projected upon said ground glass by said lenses.

6. In a motion picture camera; an aperture plate having two openings corresponding to different pictures on a standard strip of film; two lenses; an iris diaphragm for each lens; means for adjusting the position of each lens with regard to one of said openings; a ground glass member; means for placing said ground glass member directly behind said aperture plate; and a pair of prisms through which an observer may see said ground glass, said prisms being so set that they superimpose upon each other the two images projected upon said ground glass by said lenses.

7. In a motion picture camera; an aperture plate having two openings corresponding to different pictures on a standard strip of film; two lenses; means for adjusting the position of each lens with regard to one of said openings; means for separately focusing each lens; a ground glass member; means for placing said ground glass member directly behind said aperture plate; and a pair of prisms through which an observer may see said ground glass, said prisms being so set that they superimpose upon each other the two images projected upon said ground glass by said lenses.

8. In a motion picture camera; an aperture plate having two openings corresponding to different pictures on a standard strip of film; two lenses; an iris diaphragm for each lens; means for adjusting the position of each lens with regard to one of said openings; means for separately focusing each lens; a ground glass member; means for placing said ground glass member directly behind said aperture plate; and a pair of prisms through which an observer may see said ground glass, said prisms being so set that they superimpose upon each other the two images projected upon said ground glass by said lenses.

In testimony whereof I have signed my name to this specification.

JOHN E. LEONARD.